(12) United States Patent
Morikuni

(10) Patent No.: US 12,228,849 B2
(45) Date of Patent: Feb. 18, 2025

(54) OPTICAL DEVICE, PROJECTOR, AND IMAGING APPARATUS

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 725 days.

(21) Appl. No.: 17/475,484

(22) Filed: Sep. 15, 2021

(65) Prior Publication Data

US 2022/0082783 A1    Mar. 17, 2022

(30) Foreign Application Priority Data

Sep. 15, 2020   (JP) .................................. 2020-154422

(51) Int. Cl.
| | | |
|---|---|---|
| *G03B 21/28* | (2006.01) | |
| *G02B 13/16* | (2006.01) | |
| *G02B 17/08* | (2006.01) | |
| *G03B 17/17* | (2021.01) | |
| *G03B 21/14* | (2006.01) | |

(52) U.S. Cl.
CPC ............. *G03B 21/28* (2013.01); *G02B 13/16* (2013.01); *G02B 17/08* (2013.01); *G03B 17/17* (2013.01); *G03B 21/142* (2013.01)

(58) Field of Classification Search
CPC .. G03B 21/005; G03B 21/006; G03B 21/008; G03B 21/16; G03B 21/28; G03B 21/142; G03B 13/16; G03B 13/20; G03B 13/22; G03B 13/26; G02B 7/04; G02B 7/10; G02B 7/16; G02B 7/1827; G02B 17/08; G02B 17/0896; G02B 17/17
See application file for complete search history.

(56) References Cited

U.S. PATENT DOCUMENTS

| | | | |
|---|---|---|---|
| 7,048,388 B2 | 5/2006 | Takaura et al. | |
| 7,549,755 B2 | 6/2009 | Sazuki | |
| 8,107,163 B2 | 1/2012 | Nishikawa | |
| 10,534,252 B2 * | 1/2020 | Minefuji | ................ G03B 21/28 |

(Continued)

FOREIGN PATENT DOCUMENTS

| | | |
|---|---|---|
| JP | 2004-246042 | 9/2004 |
| JP | 2006-235516 | 9/2006 |

(Continued)

*Primary Examiner* — Sultan Chowdhury
(74) *Attorney, Agent, or Firm* — Dority & Manning, P.A.

(57) ABSTRACT

An optical device includes a first optical system having an optical element, a second optical system having a lens and disposed at a reduction side of the first optical system, a first holding member holding the optical element, and a first movement mechanism configured to move the first holding member in optical axis directions along an optical axis of the optical element. The optical element has a reflection surface. The first movement mechanism has a fixing member supporting the first holding member rotatably around a rotation axis and a transport portion configured to move the first holding member along the optical axis directions according to rotation of the first holding member. The reflection surface has a shape rotationally symmetrical with respect to the rotation axis. The rotation axis and the optical axis are the same axis.

16 Claims, 13 Drawing Sheets

(56) References Cited

U.S. PATENT DOCUMENTS

| | | | |
|---|---|---|---|
| 10,782,604 B2* | 9/2020 | Inui | G03B 21/00 |
| 2004/0156117 A1 | 8/2004 | Takaura et al. | |
| 2006/0193036 A1 | 8/2006 | Suzuki | |
| 2008/0158439 A1 | 7/2008 | Nishikawa | |
| 2016/0370691 A1* | 12/2016 | Takehana | G02B 7/04 |
| 2019/0011684 A1 | 1/2019 | Ishihara et al. | |
| 2019/0056648 A1* | 2/2019 | Amano | G02B 27/0955 |
| 2019/0155128 A1* | 5/2019 | Shimizu | G02B 7/10 |
| 2021/0033829 A1 | 2/2021 | Ishigame | |

FOREIGN PATENT DOCUMENTS

| | | |
|---|---|---|
| JP | 2007-316674 | 12/2007 |
| JP | 2008-116688 | 5/2008 |
| JP | 2008-242025 | 10/2008 |
| JP | 2009-229738 | 10/2009 |
| JP | 2017-156712 | 9/2017 |
| JP | 2017-156713 | 9/2017 |
| JP | 2017-156714 | 9/2017 |
| JP | 2019-133061 | 8/2019 |
| JP | 2020-042103 | 3/2020 |
| JP | 2020-194115 | 12/2020 |

\* cited by examiner

OPTICAL DEVICE, PROJECTOR, AND IMAGING APPARATUS

The present application is based on, and claims priority from JP Application Serial Number 2020-154422, filed Sep. 15, 2020, the disclosure of which is hereby incorporated by reference herein in its entirety.

BACKGROUND

1. Technical Field

The present disclosure relates to an optical device, a projector, and an imaging apparatus.

2. Related Art

JP-A-2008-116688 discloses a projector that enlarges and projects a projection image formed by an image forming unit by a projection system. The projection system of JP-A-2008-116688 includes a first optical system and a second optical system sequentially from a reduction side toward an enlargement side. The first optical system is a refractive system including a plurality of lenses. The second optical system includes a mirror. In JP-A-2008-116688, when a projection distance of the projector is changed, part of the plurality of lenses forming the first optical system and the second optical system are moved in optical axis directions.

In JP-A-2008-116688, an optical element including a reflection surface is moved in the optical axis directions relative to the refractive system. However, there is no specific description about a mechanism of moving the optical element including the reflection surface in the optical axis directions.

SUMMARY

An optical device according to an aspect of the present disclosure includes a first optical system having an optical element, a second optical system having a lens and disposed at a reduction side of the first optical system, a first holding member holding the optical element, and a first movement mechanism configured to move the first holding member in optical axis directions along an optical axis of the optical element. The optical element has a reflect on surface. The first movement mechanism has a fixing member supporting the first holding member rotatably around a rotation axis and a transport portion configured to move the first holding member along the optical axis directions according to rotation of the first holding member. The reflection surface has a shape rotationally symmetrical with respect to the rotation axis. The rotation axis and the optical axis are the same axis.

A projector according to an aspect of the present disclosure includes a light source, a light modulator modulating light emitted from the light source, and the above described optical device projecting the light modulated by the light modulator.

An imaging apparatus according to an aspect of the present disclosure includes the above described optical device, and an imager disposed on a reduction-side conjugate plane on which light emitted from the optical device is imaged.

DESCRIPTION OF EXEMPLARY EMBODIMENTS

As below, an optical device, a projector, and an imaging apparatus according to embodiments of the present disclosure will be explained with reference to the drawings.

Projector

Figure 1:
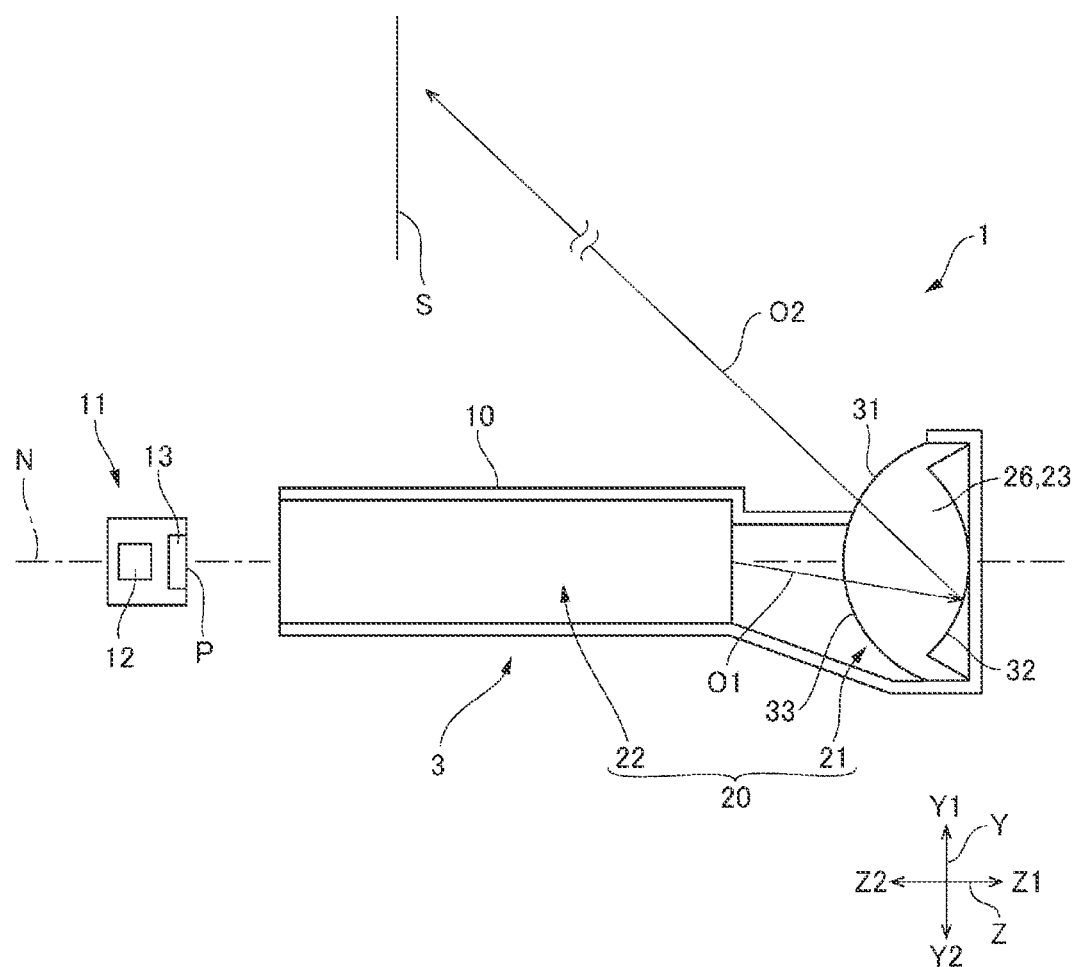
FIG. 1 is an explanatory diagram of a projector including an optical device according to the present disclosure.

FIG. 1 is an explanatory diagram of a projector 1. As shown in FIG. 1, the projector 1 includes an optical device 3 and an image forming unit 11. The optical device 3 includes a lens tube 10 and an optical system 20 housed in the lens tube 10. The image forming unit 11 forms a projection image on a reduction-side conjugate plane P of the optical system. The image forming unit 11 includes a light source 12 and a light modulator 13 that modulates a beam from the light source 12. The light modulator 13 modulates the beam from the light source 12 based on an image signal for formation of the projection image and forms the projection image on the reduction-side conjugate plane P. In this example, the light modulator 13 is a liquid crystal panel. That is, the projector 1 includes the light source 12, the light modulator 13 that modulates the light output from the light source 12, and the optical device 3 that projects the light modulated by the light modulator 13.

The optical system 20 includes a first optical system and a second optical system 22 sequentially from an enlargement side toward a reduction side. The first optical system 21 includes a reflect on surface and reflects a beam entering from the light modulator 13 via the second optical system 22 toward a side of the second optical system 22. Here, a screen is placed on an enlargement-side conjugate plane S of the optical system 20. A beam reflected by the reflection surface reaches the screen and forms an enlarged image on the screen.

In the following description, for convenience, three axes orthogonal to one another are referred to as "X-axis", "Y-axis", and "Z-axis". Z-axis directions are directions along a first optical axis N of the first optical system 21. In the Z-axis directions, a side at which the first optical system 21 is located is referred to as "first direction Z1" and a side at which the second optical system 22 is located is referred to as "second direction". Further, the side at which the screen is located with respect to the first optical axis is referred to as "upside" and the opposite side is referred to as "downside".

Optical Device of Example 1

Figure 2:
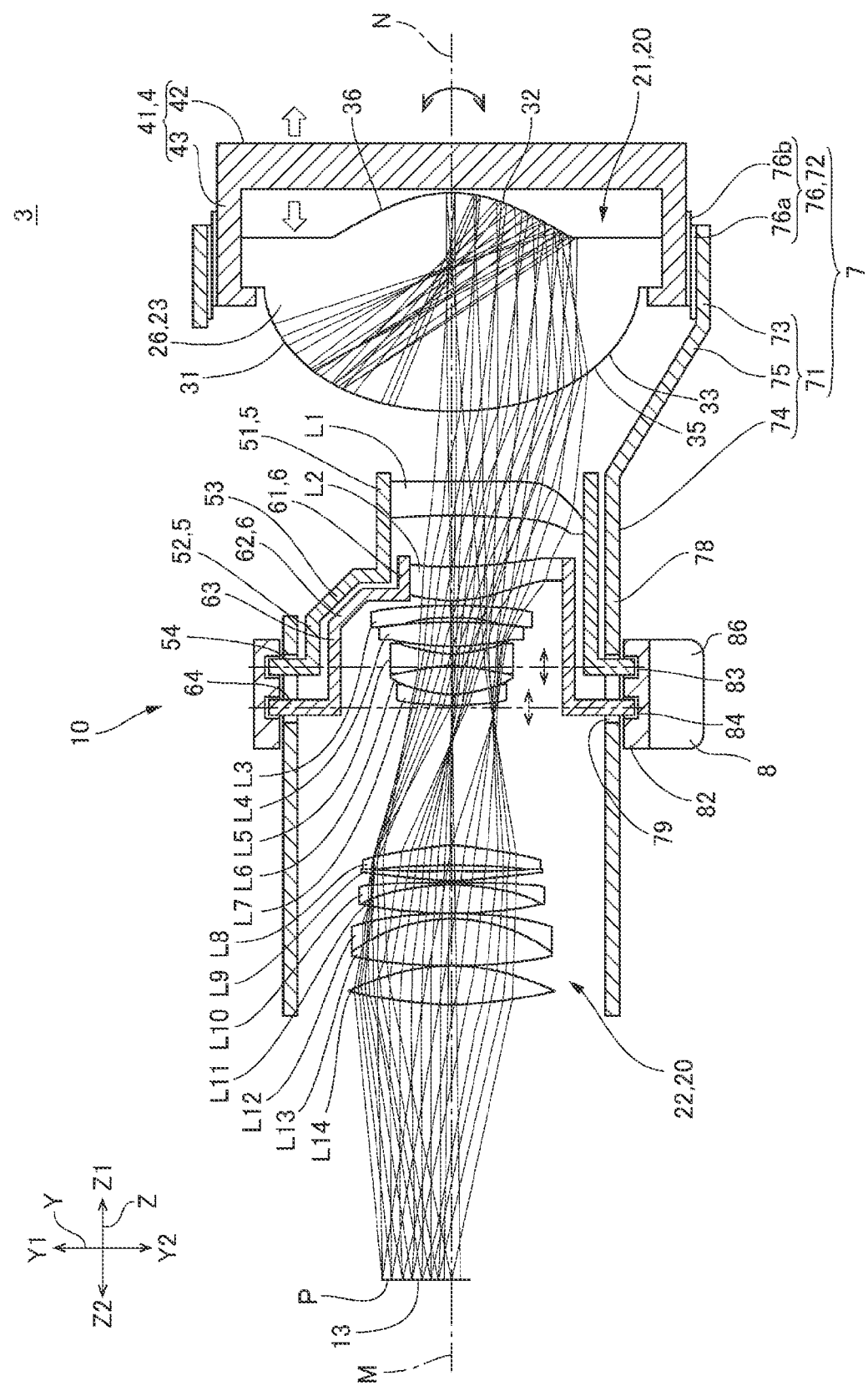
FIG. 2 is an explanatory diagram of an optical system and a lens tube of the optical device of Example 1.
Figure 3:
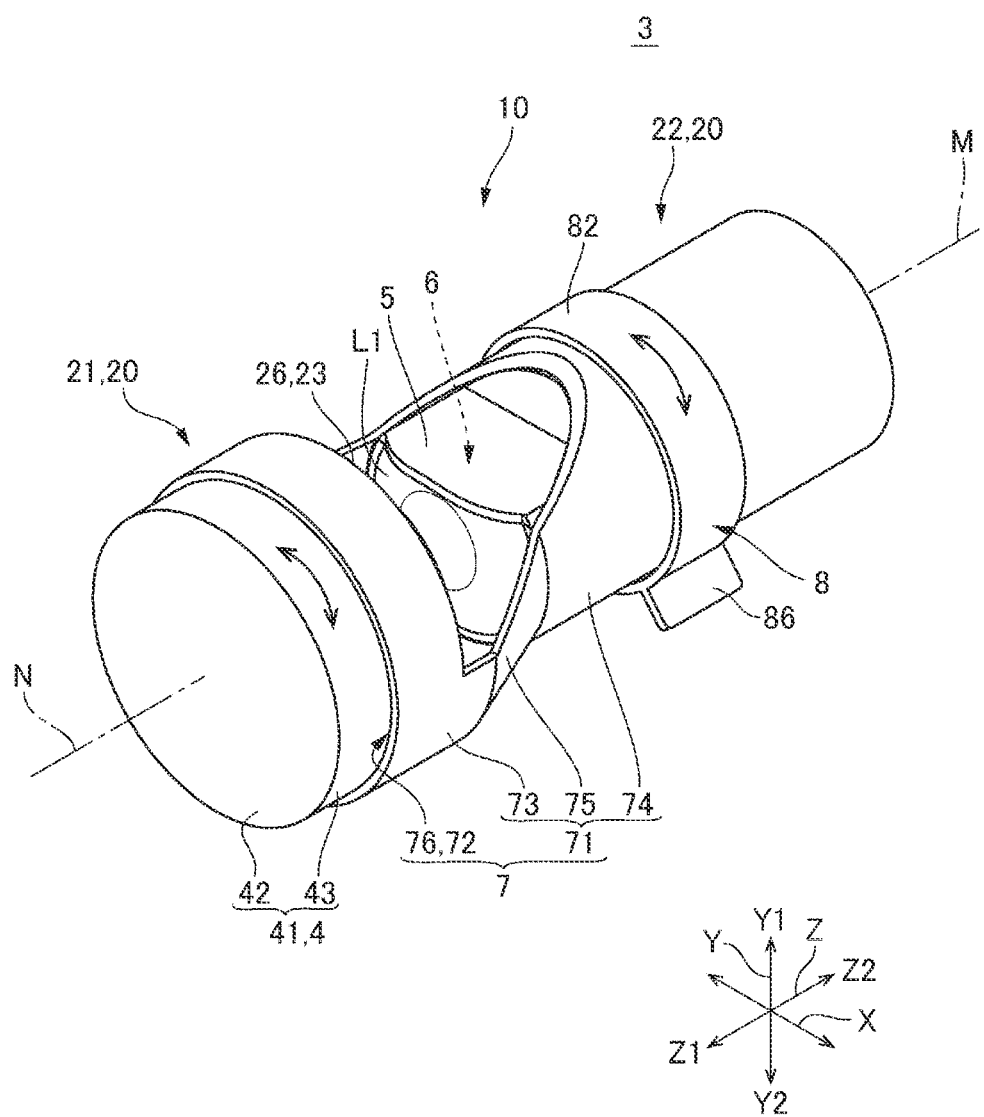
FIG. 3 is a perspective view of the optical device of Example 1.
Figure 4:
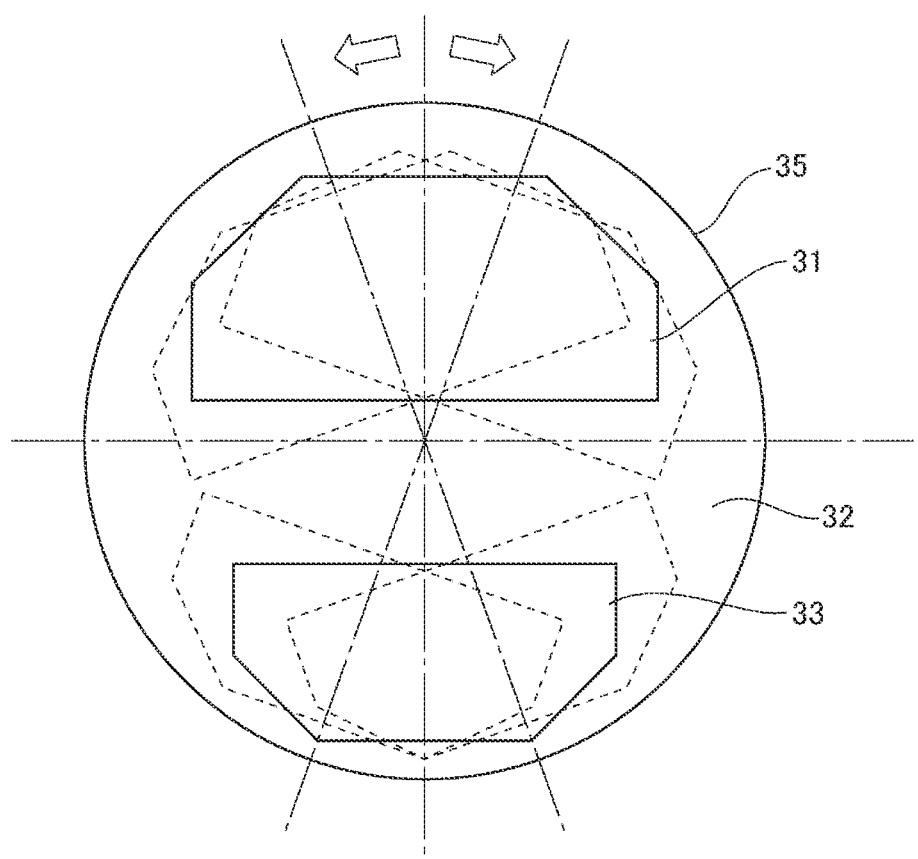
FIG. 4 is an explanatory diagram of a first face of an optical element.

FIG. 2 is an explanatory diagram of the optical system 20 and the lens tube 10 of the optical device. In FIG. 2, regarding the lens tube 10, only a main part of a movement mechanism of moving an optical element 23 and lenses is shown. FIG. 3 is a perspective view of the optical device 3. FIG. 4 is an explanatory diagram of a first face of the optical element 23.

Optical System

As shown in FIG. 2, the first optical system 21 includes one optical element 23. The second optical system 22 includes a plurality of lenses. The second optical system 22 is placed at the reduction side of the first optical system 21. The first optical axis N of the first optical system 21 is aligned with a second optical axis N of the second optical system.

The optical element 23 includes a lens 26 having a first face 35 facing the side of the second optical system and a second face 36 facing the opposite side to the first face 35, and a reflection coating layer provided on the second face 36 of the lens 26. The lens 26 is formed using glass or resin. In this example, the lens 26 is formed using resin. The first face 35 and the second face 36 of the lens 26 have convex shapes. The first optical axis N of the first optical system 21 is an optical axis of the lens 26.

As shown in FIG. 2, an area at an upside Y1 of the optical axis of the first face 35 is a first transmission surface 31 from which a beam is output toward the screen. The reflection surface 32 is provided in an area at a downside Y2 of the optical axis of the second face 36. The reflection surface 32 is a reflection coating layer. The surface shape of the second face 36 is transferred to the reflection surface 32. An area at the downside Y2 of the optical axis of the first face 35 is a second transmission surface 33 that a beam from the second optical system 22 enters. That is, the reflection surface 32 is placed at a reduction side of the first transmission surface 31 and the second transmission surface 33 is placed at a reduction side of the reflection surface 32. At least one of the first transmission surface 31, the reflection surface 32, and the second transmission surface 33 has an aspheric shape. Further, as shown in FIG. 4, the first transmission surface 31, the reflection surface 32, and the second transmission surface 33 have rotationally symmetrical shapes around the optical axis within a predetermined angle range. Therefore, when the optical element 23 is rotated in the predetermined angle range, the respective shapes of the first transmission surface 31, the reflection surface 32, and the second transmission surface 33 do not change.

The second optical system 22 includes the lens L1 to lens L14 sequentially from the enlargement side toward the reduction side. The outer diameter dimensions of the lens L1 to lens L14 are smaller than the outer diameter dimension of the first optical system. In the lens L1 and the lens L2, portions located at the upside Y1 of the second optical axis M of the second optical system 22 are cut out. Thereby, the lens L1 and the lens L2 include planar portions on upper ends of the outer circumferential surfaces thereof. Here, the second optical system 22 is located inside of the optical element 23 as seen from first optical axis N directions.

Optical Paths of Optical System

The light modulator 13 of the image forming unit 11 is placed in a position offset to the upside Y1 relative to the second optical axis N on the reduction-side conjugate plane P. The beam from the light modulator 13 enters the second optical system 22 from the upside of the second optical axis M. The beam output from the second optical system 22 passes through the downside Y2 of the second optical axis M and enters the first optical system 21. Therefore, the beam from the second optical system enters the second transmission surface 33 of the optical element 23. The beam entering the optical element 23 from the second transmission surface 33 is reflected by the reflection surface 32 and output from the first transmission surface 31 located at the upside Y1 of the first optical axis N. The beam output from the first transmission surface 31 travels toward the screen located at the upside of the first optical axis N.

Lens Tube

As shown in FIGS. 2 and 3, the lens tube 10 includes a first holding member 4 that holds the optical element 23 and a first movement mechanism 7 that moves the first holding member 4 in the first optical axis N directions. Further, the lens tube 10 has a second holding member 5 that holds the lens L1, a third holding member 6 that holds the lens L2, and a second movement mechanism 8 that moves the second holding member 5 and the third holding member 6 in the first optical axis N directions.

The first holding member 4 includes a first holding portion 41 that holds the optical element 23 at the enlargement side of the second optical system 22. The first holding portion 41 includes a disk part 42 coaxially placed with the optical element 23 in a first direction Z1 of the optical element 23 and a cylindrical part 43 coaxially provided with the disk part 42 and projecting from the disk part 42 in a second direction Z2. The optical element 23 is held at the inner circumference side of the cylindrical part 43.

The first movement mechanism 7 has a fixing member 71 rotatably supporting the first holding member 4 around a rotation axis and a transport portion 72 that moves the first holding member 4 in the first optical axis N directions according to the rotation of the first holding member 4. The fixing member 71 includes a first trunk portion 73 surrounding the cylindrical part 43 from the outer circumference side, a second trunk portion 74 located at the outside in the radial direction of the second optical system 22, and a tapered portion 75 coupling the first trunk portion 73 and the second trunk portion 74. The first trunk portion 73 has a cylindrical shape. The second trunk portion 74 has a cylindrical shape. The first trunk portion 73 and the second trunk portion 74 are coaxially provided and the axial lines thereof are aligned with the first optical axis N. The second trunk portion 74 surrounds the lens 13 to lens L14 from the outer circumference side. The outer diameter dimension of the second trunk portion 74 is smaller than the outer diameter dimension of the first trunk portion 73. The tapered portion 75 couples the lower part of the first trunk portion 73 and the lower part of the second trunk portion 74. The tapered portion 75 has the outer diameter dimension smaller toward the second direction Z2. The upper part of the tapered portion 75 is opened. Therefore, the first transmission surface 31 of the optical element 23 is exposed to the outside from the fixing member 71.

Further, the first movement mechanism 7 includes a rotation restriction portion (not shown) to set the rotation angle range of the first holding member 4 to be equal to or smaller than a predetermined rotation angle range. When the first holding member rotates over the predetermined rotation angle range, the rotation restrict ion portion contacts the first holding member 4 from the downstream in the rotation direction and prevents the first holding member 4 from rotating more. The rotation restriction portion is provided in the fixing member 71.

The transport portion 72 is provided between the first trunk portion 73 of the fixing member 71 and the cylindrical part 43 of the first holding member 4. The transport portion 72 is a helicoid 76. Therefore, the first trunk portion 73 includes a helicoid female thread 76a and the cylindrical part 43 includes a helicoid male thread 76b. When the first holding member 4 is rotated, the first holding member 4 is moved in the first optical axis N directions by the transport portion 72. Therefore, the optical element 23 moves in the first optical axis N directions while rotating around the optical axis.

The second holding member 5 includes a second holding portion 51 that surrounds the lens L1 from the outer circumference side and a first link portion 52 extending from the second holding portion 51 in the second direction 22. The second holding portion 51 is a frame-shaped part along the contour shape of the lens L1. The first link portion 52 includes a first tubular part 53 and a first pin 54 (cam follower part) projecting from an end part of the first tubular part 53 in the second direction Z2 outward in the radial direction. The upper part of the first tubular part 53 is larger in outer diameter dimension in a stepwise fashion toward the second direction 22.

The third holding member 6 includes a third holding portion 61 that surrounds the lens L2 from the outer circumference side and a second link portion 62 extending from the third holding portion 61 in the second direction Z2. The third holding portion 61 is a frame-shaped part along the contour shape of the lens L2. The second link portion 62 includes a second tubular part 63 and a second pin 64 (cam follower part) projecting from an end part of the second tubular part 63 in the second direction Z2 outward in the radial direction. The upper part of the second tubular part 63 is larger in outer diameter dimension in a stepwise fashion toward the second direction Z2.

The end part of the second tubular part 63 of the third holding member 6 in the second direction and the end part of the first tubular part 53 of the second holding member 5 in the second direction overlap as seen from a direction orthogonal to the first optical axis N. Further, the second tubular part 63 of the third holding member 6 and the first tubular part 53 of the second holding member 5 are sequential placed from the inner circumference side toward the outer circumference side.

Here, the second trunk portion 74 of the fixing member 71 includes an overlap part 78 overlapping with the second tubular part 63 of the third holding member 6 and the first tubular part 53 of the second holding member 5 as seen from the outside in the radial direction. The second tubular part 63 of the third holding member 6, the first tubular part 53 of the second holding member 5, and the overlap part 78 are sequentially placed from the inner circumference side toward the outer circumference side.

A guide groove 79 (guide portion) L1 nearly extending in the first optical axis N directions is provided in the overlap part 78. The first pin 54 and the second pin 64 penetrate the guide groove 79 in the radial direction. The first pin 54 is located in the first direction Z1 of the second pin 64. There is a gap between the first pin 54 and the second pin 64.

The second movement mechanism 8 is located at the outside in the radial direction side of the second optical system 22. The second movement mechanism 8 includes a cam member 82 rotatably supported by the overlap part 78, and a first cam portion 83 and a second cam portion 84 provided in the cam member 82. The cam member 82 has an annular shape and rotates around the first optical axis N. The first cam portion 83 and the second cam portion 84 are respectively helical grooves inclined in the circumferential directions toward the first optical axis N directions. The first pin 54 penetrating the guide groove 79 is inserted into the first cam portion 83. The second pin 64 penetrating the guide groove 79 is inserted into the second cam portion 84. Here, the second movement mechanism 8 overlaps with the optical element 23 as seen from the first optical axis N directions. Further, an operation lever 86 projecting outward in the radial direction is provided in the cam member 82. The operation lever 86 is provided to project from a case portion (not shown) of the projector 1 housing the optical device 3.

When the cam member 82 is rotated, the first pin 54 slides the first cam portion 83. The second pin 64 slides the second cam portion 84. Further, the first pin 54 and the second pin 64 are guided by the guide groove 79 in the first optical axis N directions. Therefore, when the cam member 82 is rotated, the first pin 54 moves in the first optical axis N directions Thereby, the second holding member 5 moves in the first optical axis N directions, and the lens L1 moves in the first optical axis N directions. Further, when the cam member 82 is rotated, the second pin 64 moves in the first optical axis N directions Thereby, the third holding member 6 moves in the first optical axis N directions, and the lens L2 moves in the first optical axis N directions.

Functions and Effects

In the optical device 3 of this example, the first holding member 4 moves in the first optical axis N directions by the transport portion 72 according to the rotation of the first holding member 4. Therefore, the optical element 23 including the reflection surface 32 may be moved in the first optical axis N directions.

Further, the transport portion 72 is the helicoid 76 provided between the fixing member 71 and the first holding member 4. Therefore, the optical element 23 moves in the first optical axis N directions without eccentricity.

Furthermore, the optical device 3 includes the second holding member 5 holding the lens L1, the third holding member 6 holding the lens L2, and the second movement mechanism 8 moving the second holding member 5 and the third holding member 6 in the first optical axis N directions. Therefore, the lens of the second optical system 22 may be moved in the first optical axis N directions separately from the optical element 23 of the first optical system 21.

In this example, the fixing member 71 has the overlap part 78 overlapping with the second holding member 5 as seen from the direction orthogonal to the first optical axis N. The second movement mechanism 8 has the cam member 82 supported rotatably around the first optical axis N by the overlap part 78 and the first cam portion 83 and the second cam portion 84 provided in the cam member 82. Further, the second holding member 5 has the first pin 54 sliding the first cam portion 83, and the third holding member 6 has the second pin 64 sliding the second cam portion 84. Furthermore, the second movement mechanism 8 has the guide groove 79 provided in the overlap part 78 and guiding the first pin 54 and the second pin 64 in the first optical axis N directions. Therefore, the cam member 82 is rotated, and thereby, the lens L1 held by the second holding member 5 may be moved in the first optical axis N directions. Further, the cam member 82 is rotated, and thereby, the lens L2 held by the third holding member 6 may be moved in the first optical axis N directions.

In this example, the reflection surface 32 of the optical element 23 of the first optical system 21 is a concave curved surface. The first optical system 21 includes the reflection surface 32 of the concave curved surface, and thereby, the magnification factor of the optical system 20 including the first optical system 21 and the second optical system 22 may be easily increased.

Further, the optical element 23 has the first face 35 facing the side of the second optical system 22, the second face 36 facing the opposite side to the first face 35, and the reflection coating layer provided on the second face 36. The second face 36 has the convex shape. The first transmission surface 31 and the second transmission surface 33 are provided on the first face 35. The reflection surface 32 is the reflection coating layer and the surface shape of the second face 36 may be transferred thereto. Furthermore, the first holding member 4 rotates within the predetermined angle range, and the first transmission surface 31, the reflection surface 32, and the second transmission surface 33 have the rotationally symmetrical shapes around the first optical axis N in the predetermined angle range. Therefore, even when the first holding member 4 rotates and the optical element 23 rotates around the first optical axis N by the transport portion 72, optical characteristics of the first transmission surface 31, the reflection surface 32, and the second transmission surface 33 do not change. That is, the first transmission surface 31, the reflection surface 32, and the second transmission surface 33 have rotationally symmetrical shapes with respect to the rotation axis of the first holding member 4, and the rotation axis of the first holding member 4 and the first optical axis N are the sane axis.

In the projector 1 of this example, when the projection distance is changed, the optical element 23, the lens L1, and the lens L2 of the optical device 3 may be respectively moved in the first optical axis N directions and focused.

MODIFIED EXAMPLES

Figure 5:
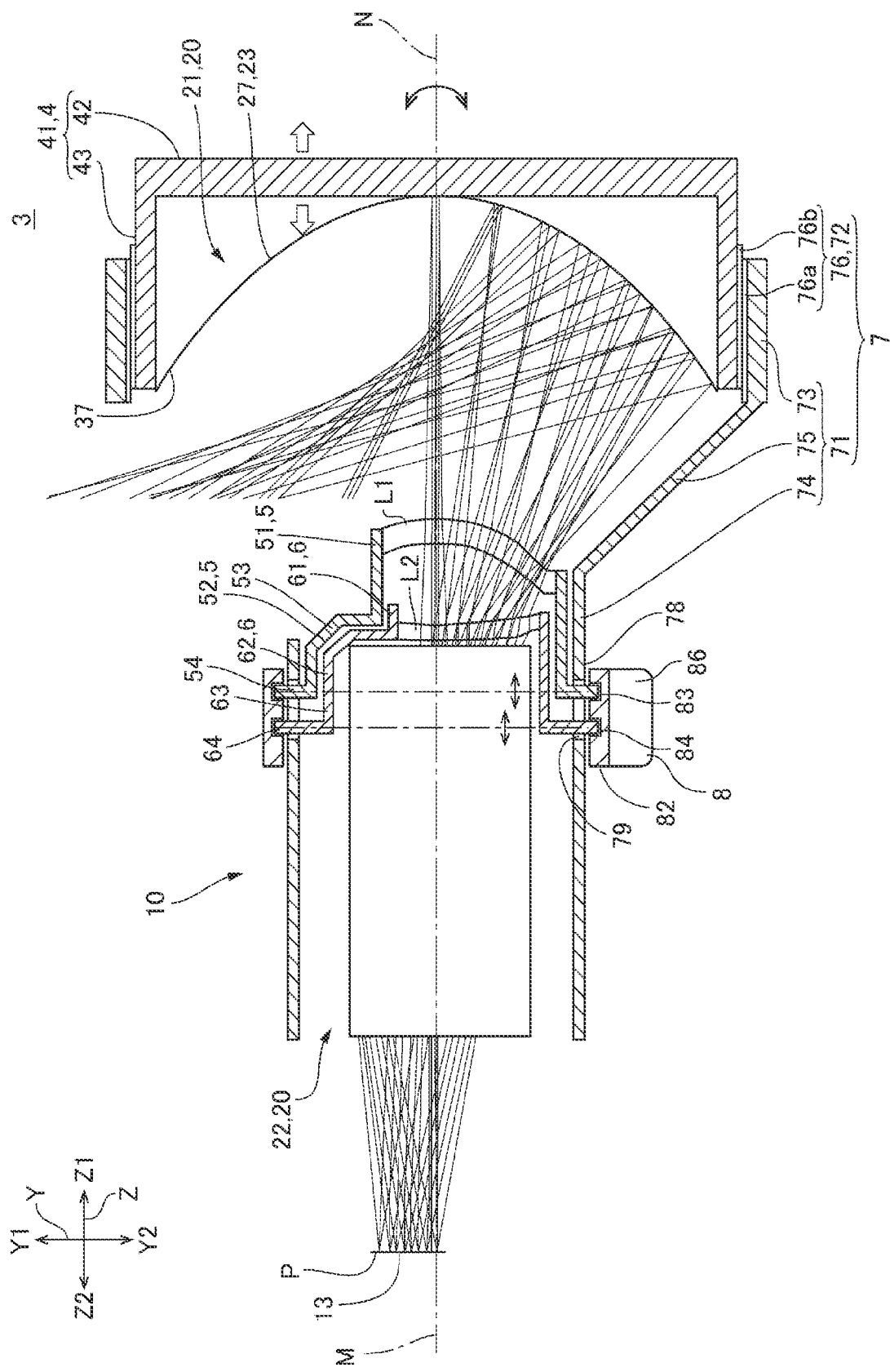
FIG. 5 is an explanatory diagram of an optical system and a lens tube in an optical device of Modified Example 1 of Example 1.

FIG. 5 is an explanatory diagram of the optical system 20 and the lens tube 10 of the optical device 3 of Modified Example 1. The optical device 3 of Modified Example 1 includes a concave mirror 27 as the optical element 23 of the first optical system 21. Here, the optical device 3 of Modified Example 1 has the same configuration as the above described optical device 3 except the optical element 23 of the first optical system 21. Therefore, the corresponding configurations have the same signs and the explanation thereof will be omitted. Further, in FIG. 5, part of the lens configuration of the second optical system 22 is omitted.

The first optical axis N of the first optical systems 21 is an optical axis of the concave mirror 27. The optical axis of the concave mirror 27 passes through the center of the concave mirror 27. In the concave mirror 27, a reflection surface 37 reflecting the beam from the second optical system 22 toward the screen is provided in an area at the downside of the first optical axis N. The reflect on surface 37 has an aspherical shape. Further, the reflection surface 37 has a rotationally symmetrical shape around the optical axis in a predetermined angle range. Therefore, when the optical element 23 is rotated in the predetermined angle range, the shape of the reflection surface 37 does not change.

Also, in this example, the same functions and effects as those of the optical device of Example 1 may be obtained.

Figure 6:
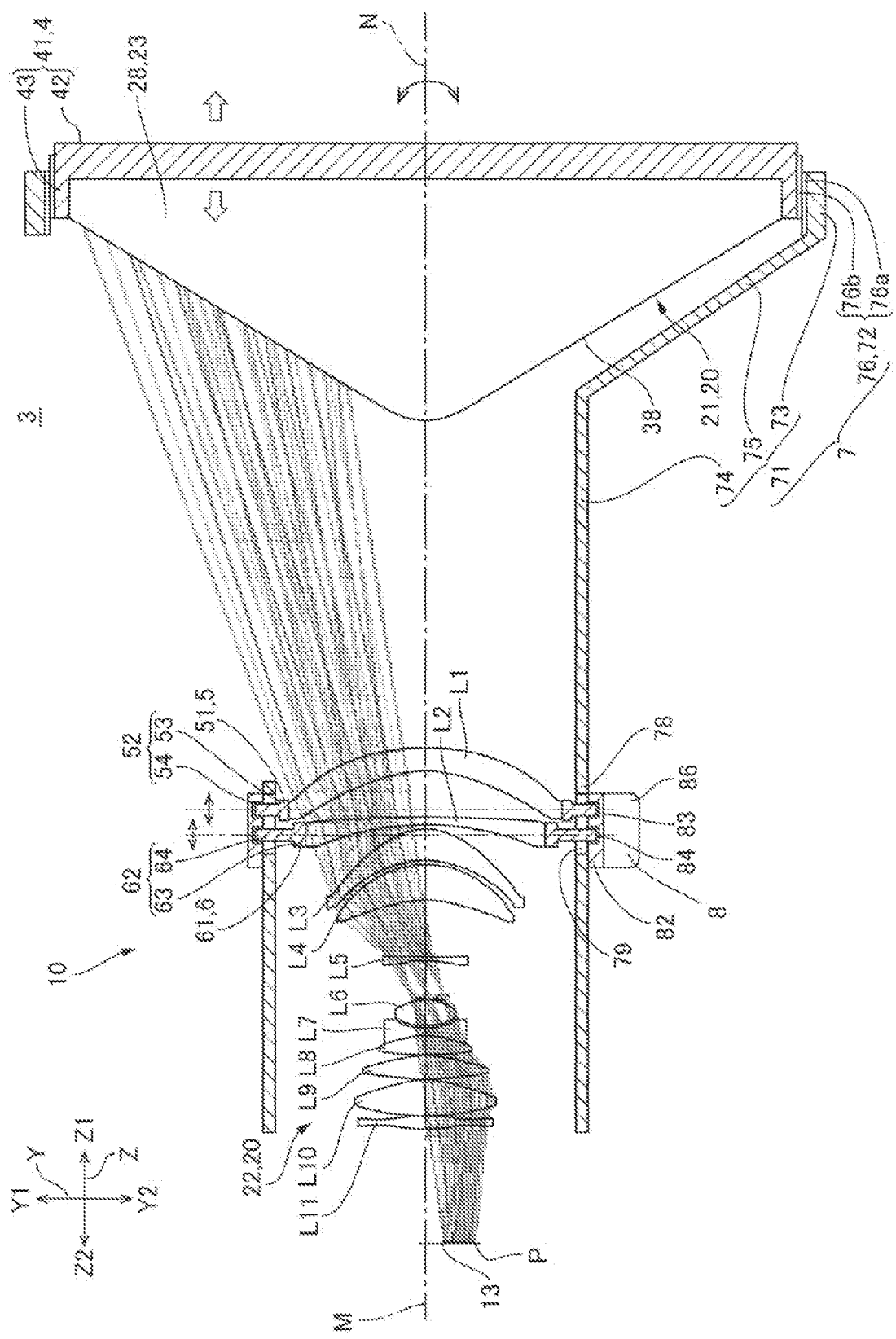
FIG. 6 is an explanatory diagram of an optical system and a lens tube in an optical device of Modified Example 2 of Example 1.

FIG. 6 is an explanatory diagram of the optical system 20 and the lens tube 10 of the optical device 3 of Modified Example 2. In the optical device 3 of Modified Example 2, the optical element 23 of the first optical system 21 includes a convex mirror 28 as a convex curved surface toward the side of the second optical system 22. Here the optical device of Modified Example 2 has the same configuration as the above described optical device 3 except the optical element 23 of the first optical system 21. Therefore, the corresponding configurations have the same signs and the explanation thereof will be omitted.

The optical element 23 has a rotationally symmetrical shape with respect to the first optical axis N. Accordingly, the optical axis of the optical element 23 passes through the center of the convex mirror 28. In the convex mirror 28, a reflection surface 38 reflecting the beam from the second optical system 22 toward the screen is provided in an area at the upside of the first optical axis N. The reflection surface 38 has an aspherical shape. Further, the reflection surface 38 has a rotationally symmetrical shape around the optical axis in a predetermined angle range. Therefore, when the optical element 23 is rotated in the predetermined angle range, the shape of the reflection surface 38 does not change.

Also, in this example, the same functions and effects as those of the optical device of Example 1 may be obtained.

Other Modified Example

Figure 7:
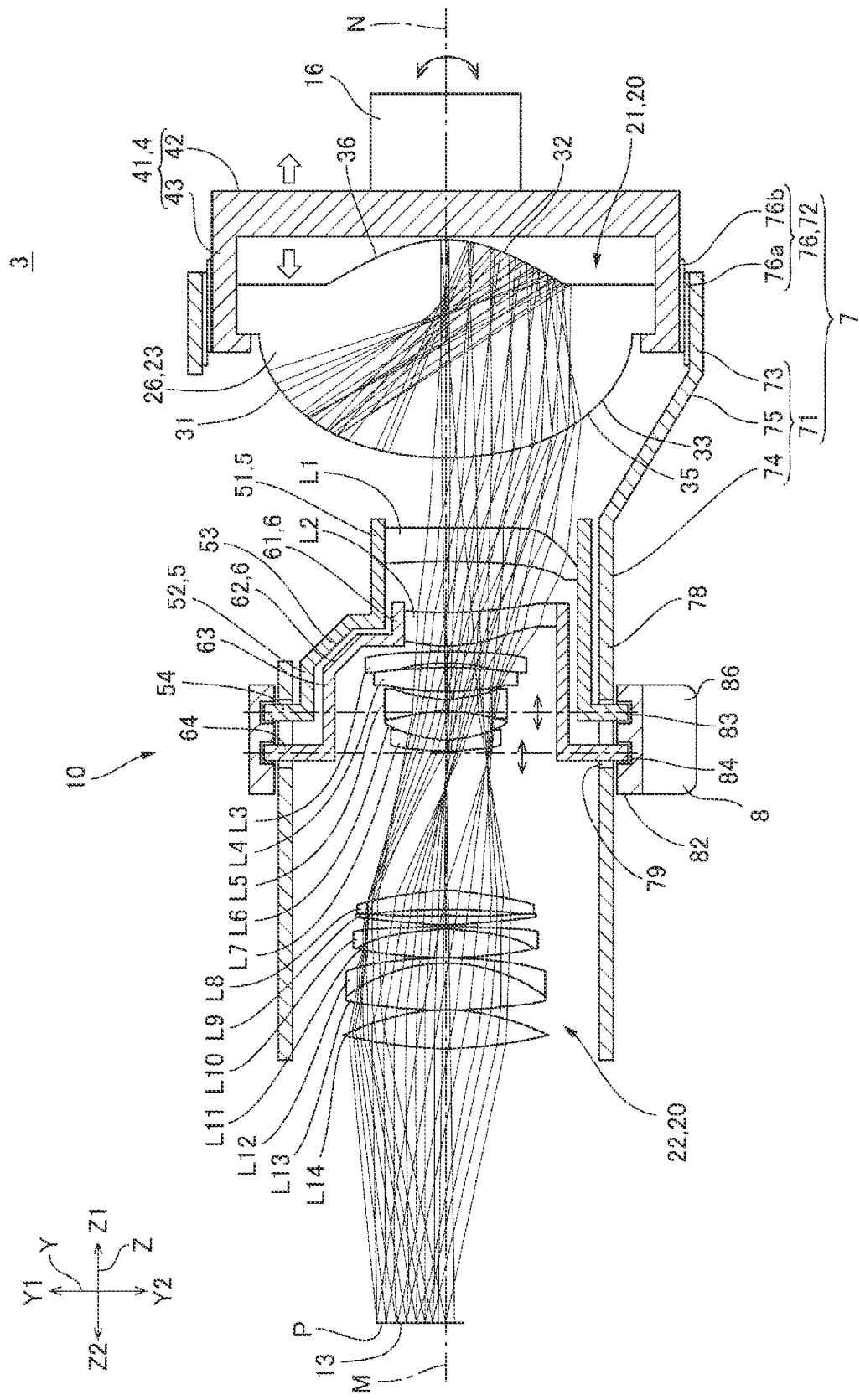
FIG. 7 is an explanatory diagram of an optical system and a lens tube in an optical device of another modified example.

As shown in FIG. 7, the first holding member 4 may include an operation portion 16 for rotating the first holding member 4 on the first holding member 4 at the opposite side to the second optical system 22. The operation portion 16 projects from the disk part 42 in the first direction Z1. In this case, the rotation axis of the operation portion 16 and the first optical axis N may be the same axis. According to the configuration, the operation portion 16 is provided at the opposite side to the projection direction from the reflection surface 32 toward the screen. Therefore, the optical element 23 may be moved while the enlarged image projected on the screen is viewed.

Figure 8:
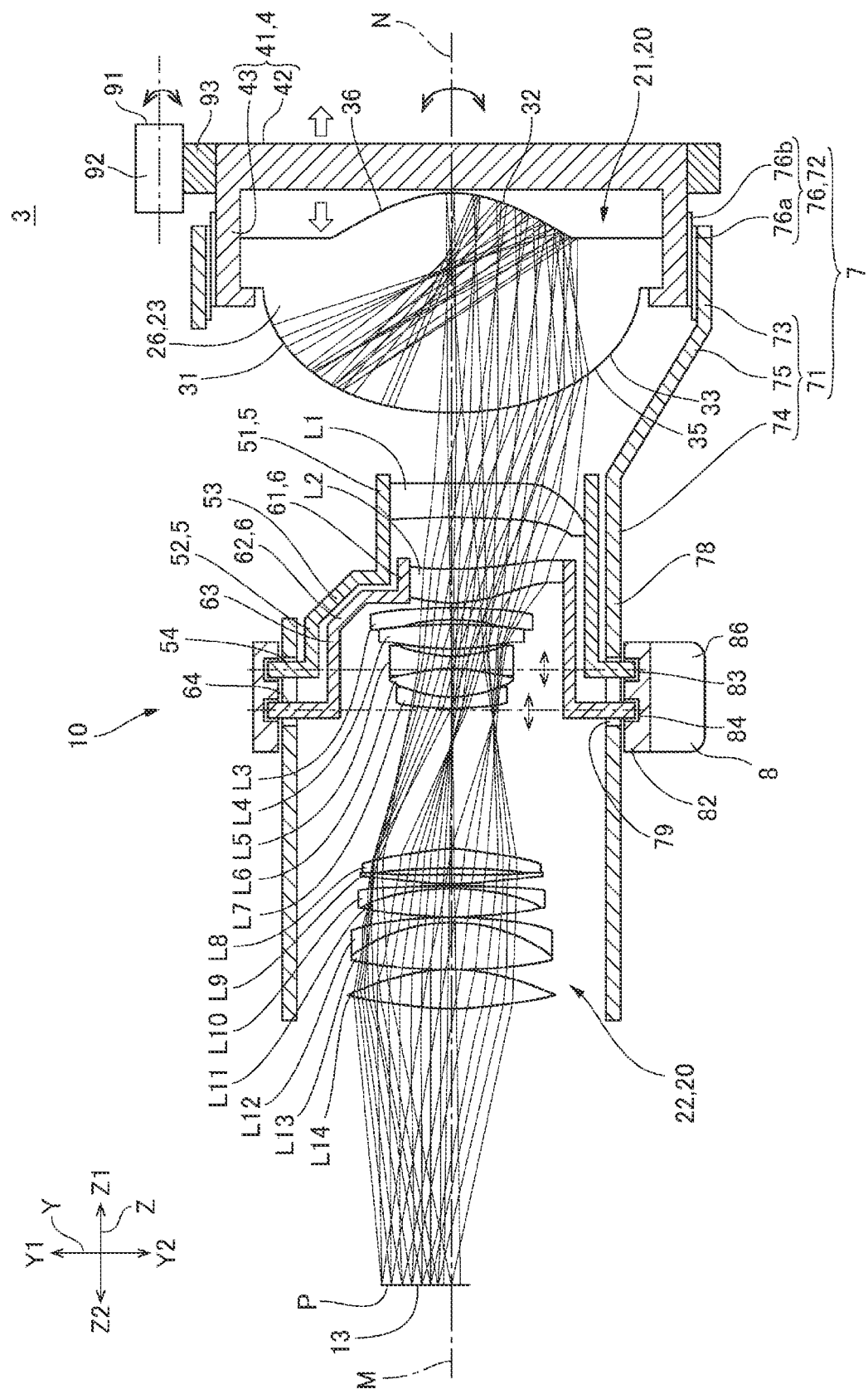
FIG. 8 is an explanatory diagram of an optical system and a lens tube in an optical device of another modified example.

As shown in FIG. 8, the first movement mechanism 7 may include an operation member 91 rotatable around a rotation axis parallel to the first optical axis N, a first teeth portion 92 provided in the operation member 91, and a second teeth portion 93 prod in the first holding member 4 and meshing with the first teeth portion 92 at a predetermined reduction ratio. According to the configuration, the operation member 91 is rotated, and thereby, the optical element 23 may be moved in the first optical axis N directions. Further, according to the configuration, when the operation member 91 is rotated, the rotation angle of the first holding member 4 is smaller than the rotation angle of the operation member 91. Therefore, the position of the optical element in the first optical axis N directions may be finely adjusted.

Example 2

Figure 9:
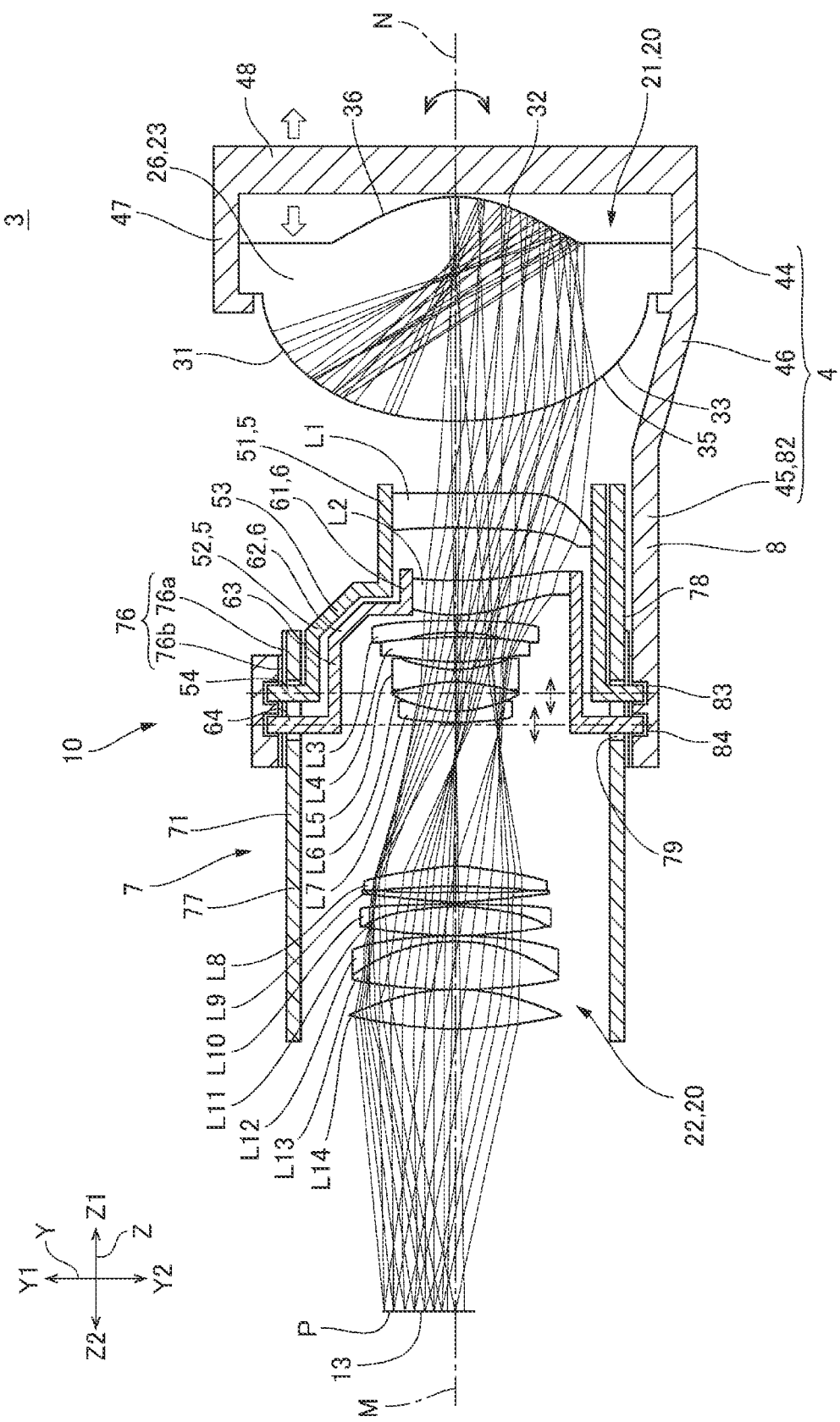
FIG. 9 is an explanatory diagram of an optical system and a lens tube of an optical device of Example 2.
Figure 10:
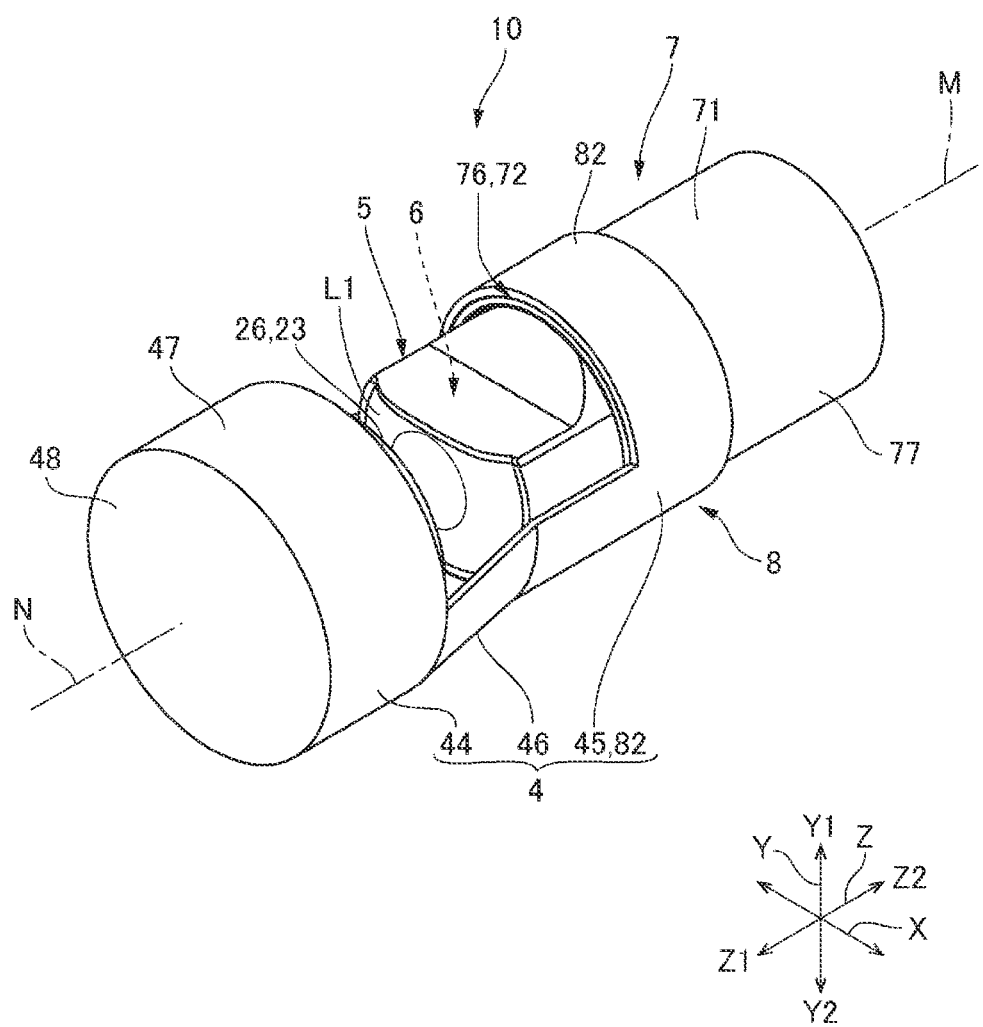
FIG. 10 is a perspective view of the optical device of Example 2.

FIG. 9 is an explanatory diagram of the optical system 20 and the lens tube 10 of the optical device 3 of Example 2. FIG. 10 is a perspective view of the optical device 3 of Example 2. In the optical device 3 of Example 2, the position of the transport portion 72 of the first movement mechanism 7 moving the optical element 23 is provided at the outside in the radial direction of the second optical system 22. The rest of the configuration of the optical device 3 of Example 2 is the same as that of the above described optical device.

Therefore, the corresponding configurations have the same signs and the explanation thereof will be omitted.

In this example, the first holding member 4 holding the optical element 23 has a first holding portion 44 holding the optical element 23 at the enlargement side of the second optical system 22, a cylindrical portion 45 located at the outside in the radial direction of the second optical system 22, and a tapered portion 46 coupling the first holding portion 44 and the cylindrical portion 45. The first holding portion 44 includes a tubular part 47 and a plate part 48 closing an end of the tubular part 47 in the second direction. The tubular part 47 coaxially holds the optical element 23. The first holding portion 44 and the cylindrical portion 45 are coaxially provided and the axial lines thereof are aligned with the first optical axis N. The outer diameter dimension of the cylindrical portion 45 is smaller than the outer diameter dimension of the first holding portion 44. The tapered portion 46 couples the lower part of the first holding portion 44 and the lower part of the cylindrical portion 45. The tapered portion 46 has the outer diameter dimension smaller toward the second direction Z2. The upper part of the tapered portion 46 is opened. Therefore, the first transmission surface 31 of the optical element 23 is exposed to the outside from the first holding member 4.

The first movement mechanism 7 moving the optical-element 23 has the fixing member 71 rotatably supporting the first holding member 4 and the transport portion 72 moving the first holding member 4 in the first optical axis N directions when the first holding member 4 rotates.

The fixing member 71 includes a trunk portion 77 located at the outside in the radial direction of the second optical system. The trunk portion 77 is coaxially placed with the first holding member 4. The axial line of the trunk portion 77 and the axial line of the first holding member 4 are aligned with the first optical axis N. The trunk portion 77 includes the overlap part 78 overlapping with the second holding member 5 and the third holding member 6 as seen from a direction orthogonal to the first optical axis N. In the first holding member 4, the cylindrical portion 45 is rotatably supported by the overlap part 78 of the fixing member 71.

The transport portion 72 is provided between the overlap part 78 and the cylindrical portion 45 of the first holding member 4. Therefore, the transport portion 72 is located at the outside in the radial direction of the second optical system 22. The transport portion 72 is the helicoid 76. When the first holding member 4 is rotated, the first holding member 4 is moved in the first optical axis N directions by the transport portion 72. Therefore, the optical element 23 moves in the first optical axis N directions while rotating around the optical axis.

Here, the end part of the second tubular part 63 of the third holding member 6 holding the lens L2 in the second direction Z2 and the end part of the first tubular part 53 of the second holding member 5 holding the lens L1 in the second direction Z2 overlap as seen from a direction orthogonal to the first optical axis N. Further, the second tubular part 63 of the third holding member 6 and the first tubular part 53 of the second holding member 5 are sequentially placed from the inner circumference side toward the outer circumference side. Further, the second tubular part 63 of the third holding member 6, the first tubular part 53 of the second holding member 5, and the overlap part 78 are sequentially placed from the inner circumference side toward the outer circumference side.

The guide groove 79 (guide portion) linearly extending in the first optical axis N directions is provided in the overlap part 78. The first pin 54 and the second pin 64 penetrate the guide groove 79 in the radial direction. The first pin 54 is located in the first direction Z1 of the second pin 64. There is a gap between the first pin 54 and the second pin 64.

The second movement mechanism 8 is located at the outside in the radial direction side of the second optical system 22. The second movement mechanism 8 includes the cam member 82 rotatably supported by the overlap part 78, and the first cam portion 83 and the second cam portion 84 provided in the cam member 82. In this example, the cam member 82 is the cylindrical portion 45 of the first holding member 4. Therefore, the first cam portion 83 and the second cam portion 84 are respectively provided in the cylindrical portion 45. The first cam portion 83 and the second cam portion 84 are respectively helical grooves inclined in the circumferential directions toward the first optical axis N directions. The first pin 54 penetrating the guide groove 79 is inserted into the first cam portion 83. The second pin 64 penetrating the guide groove 79 is inserted into the second cam portion 84. Here, the second movement mechanism 8 overlaps with the optical element 23 as seen from the first optical axis N directions.

When the first holding member 4 is rotated, the first pin 54 slides the first cam portion 83. The second pin 64 slides the second cam portion 84. Further, the first pin 54 and the second pin 64 are guided by the guide groove 79 in the first optical axis N directions. Therefore, when the cam member 82 is rotated, the first pin 54 moves in the first optical axis N directions. Thereby, the second holding member 5 moves in the first optical axis N directions, and the lens L1 moves in the first optical axis N directions. Further, when the cam member 82 is rotated, the second pin 64 moves in the first optical axis N directions. Thereby, the third holding member 6 moves in the first optical axis N directions, and the lens L2 moves in the first optical axis N directions.

In the optical device 3 of this example, when the first holding member 4 is rotated, the first holding member 4 moves in the optical axis directions by the transport portion 72. Therefore, the optical element 23 including the reflection surface 32 may be moved in the first optical axis N directions. Further, when the first holding member 4 is rotated, the second holding member 5 holding the lens L1 and the third holding member 6 holding the lens L2 may be moved in the first optical axis N directions by the second movement mechanism 8. Therefore, the optical element 23 of the first optical system 21 and the lens L1 and the lens L2 of the second optical system 22 may be moved in the first optical axis N directions in cooperation.

In the optical device of this example, the same functions and effects as those of the above described optical device may be obtained.

MODIFIED EXAMPLES

Figure 11:
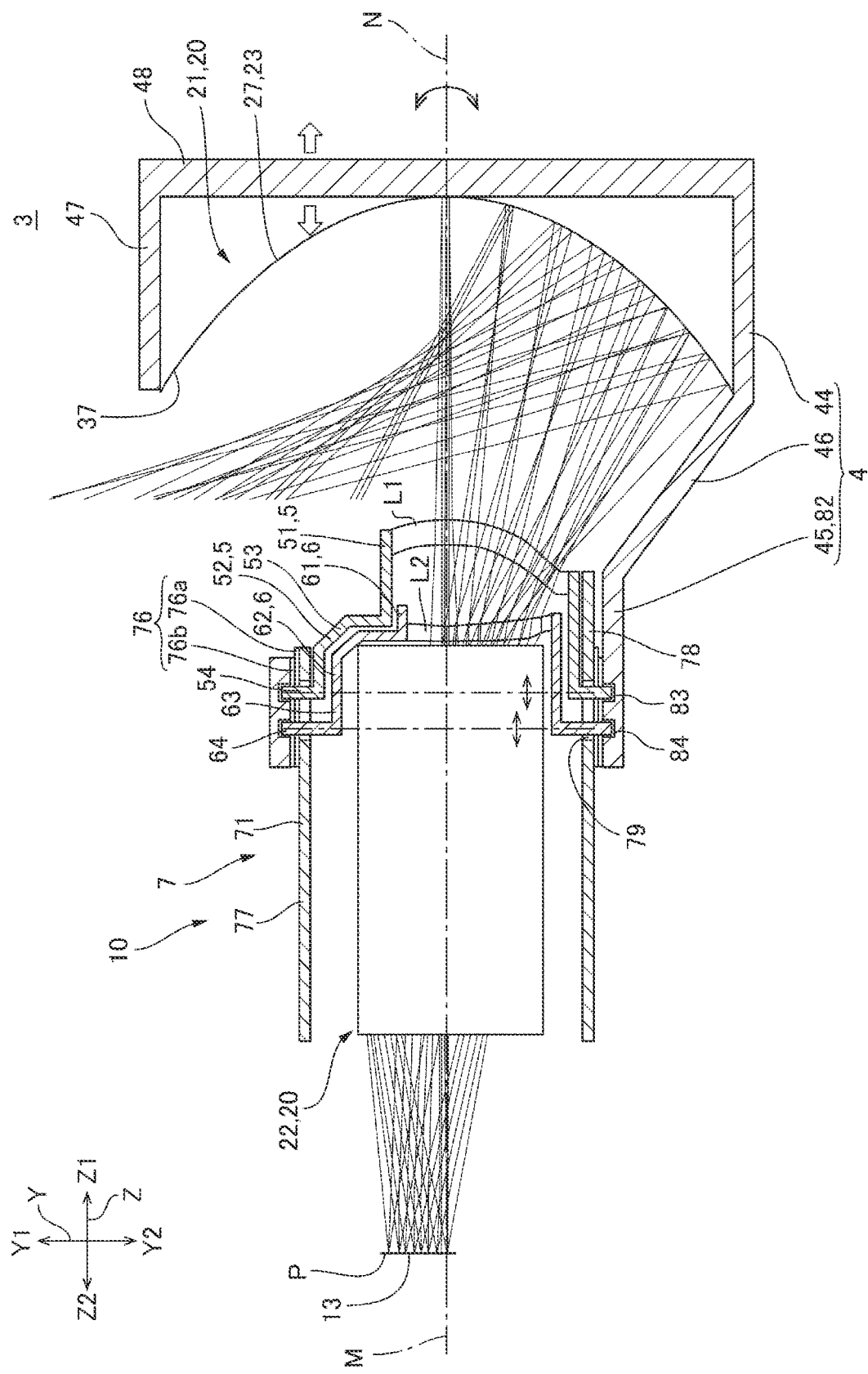
FIG. 11 is an explanatory diagram of an optical system and a lens tube in an optical device of Modified Example 1 of Example 2.

FIG. 11 is an explanatory diagram of the optical system 20 and the lens tube 10 of the optical device 3 of Modified Example 1 of Example 2. The optical device 3 of Modified Example 1 includes the concave mirror 27 as the optical element 23 of the first optical system 21. Here, the optical device 3 of Modified Example 1 has the same configuration as the above described optical device 3 except the optical element 23 of the first optical system 21. Therefore, the corresponding configurations have the same signs and the explanation thereof will be omitted. Further, in FIG. 11, part of the lens configuration of the second optical system 22 is omitted.

The first optical axis N of the first optical system 21 is an optical axis of the concave mirror 27. The optical axis of the concave mirror 27 passes through the center of the concave mirror 27. In the concave mirror 27, the reflection surface 37 reflecting the beam from the second optical system 22 toward the screen is provided in the area at the downside of the first optical axis N. The reflection surface 37 has the aspherical shape. Further, the reflection surface 37 has the rotationally symmetrical shape around the optical axis in a predetermined angle range. Therefore, when the optical element 23 is rotated in the predetermined angle range, the shape of the reflection surface 37 does not change.

Also, in this example, the same functions and effects as those of the optical device of Example 2 may be obtained.

Figure 12:
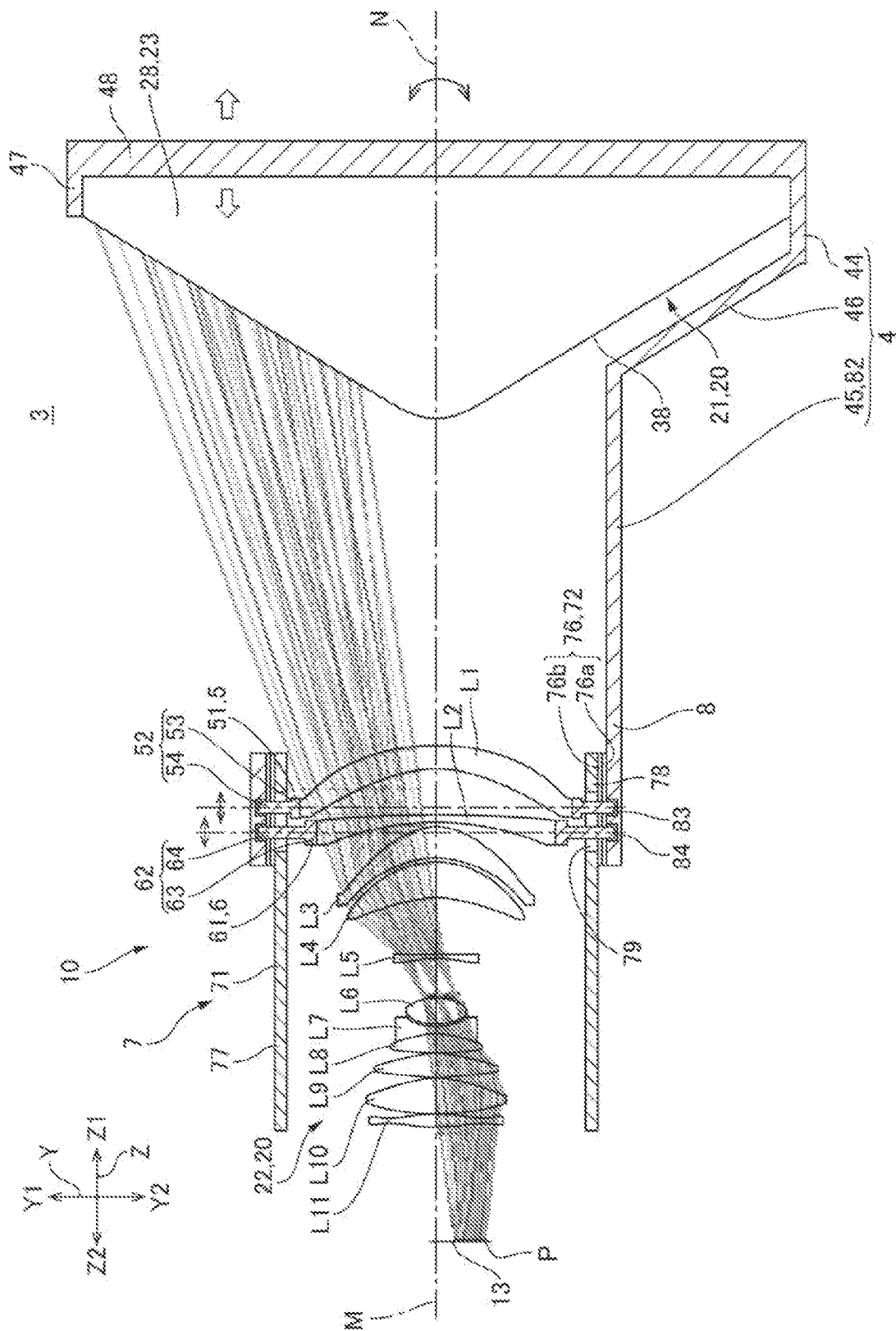
FIG. 12 is an explanatory diagram of an optical system and a lens tube in an optical device of Modified Example 2 of Example 2.

FIG. 12 is an explanatory diagram of the optical system 20 and the lens tube 10 of the optical device 3 of Modified Example 2 of Example 2. In the optical device 3 of Modified Example 2, the optical element 23 of the first optical system 21 includes the convex mirror 28 having the convex shape toward the side of the second optical system 22. Here, the optical device of Modified Example 2 has the same configuration as the above described optical device 3 except the optical element of the first optical system 21. Therefore, the corresponding configurations have the same signs and the explanation thereof will be omitted.

The optical element 23 has the rotationally symmetrical shape with respect to the first optical axis N. Accordingly, the optical axis of the optical element 23 passes through the center of the convex mirror 28. In the convex mirror 28, the reflection surface 38 reflecting the beam from the second optical system 22 toward the screen is provided in an area at the upside of the first optical axis N. The reflection surface 38 has the aspherical shape. Further, the reflection surface 38 has the rotationally symmetrical shape around the optical axis in a predetermined angle range. Therefore, when the optical element 23 is rotated in the predetermined angle range, the shape of the reflection surface 38 does not change.

Also, in this example, the same functions and effects as those of the optical device of Example 2 may be obtained.

Like the other examples of Example 1, the first holding member 4 may include an operation portion for rotating the first holding member 4 on the first holding member 9 at the opposite side to the second optical system 22. Further, the first movement mechanism 7 may include an operation member rotatable around a rotation axis parallel to the first optical axis N, a first teeth portion provided in the operation member, and a second teeth portion provided in the first holding member 4 and meshing with the first teeth portion at a predetermined reduction ratio.

Imaging Apparatus

Figure 13:
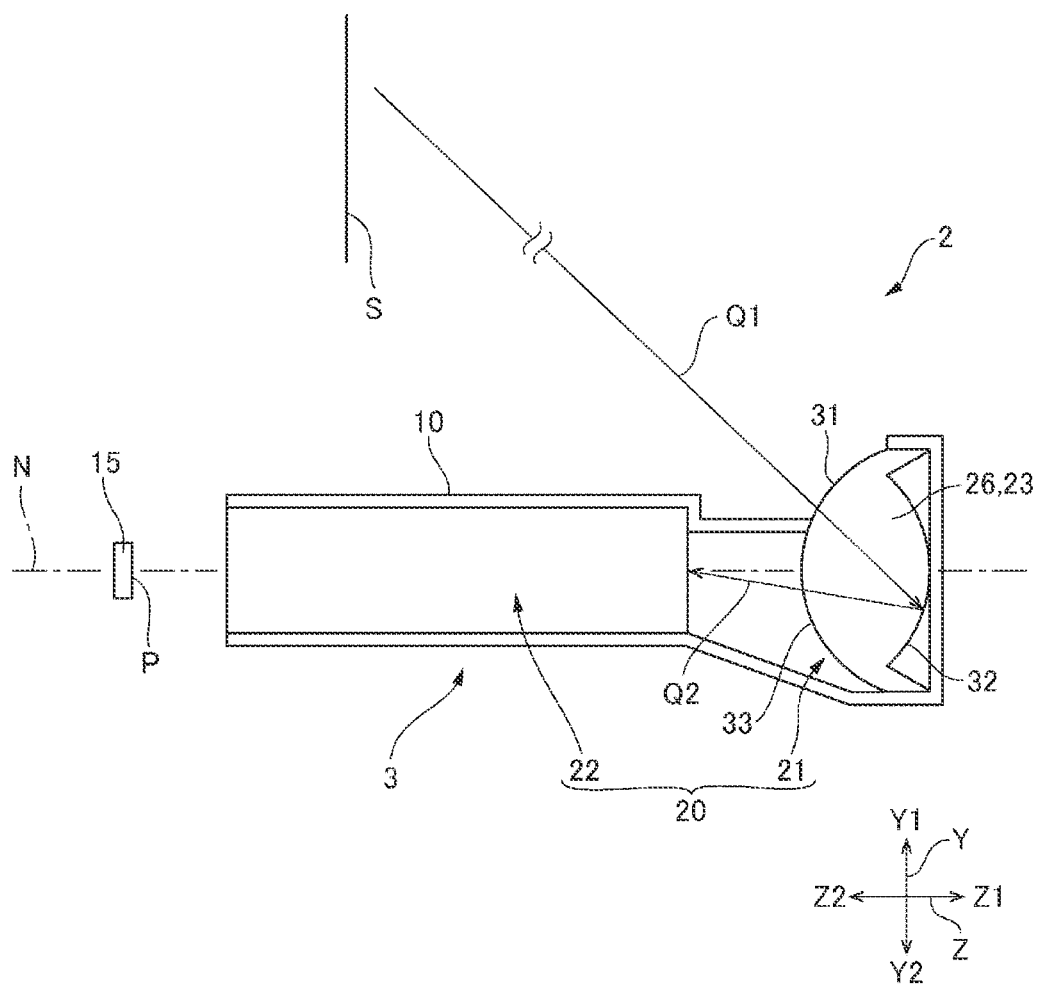
FIG. 13 is an explanatory diagram of an imaging apparatus including the optical device according to the present disclosure.

Here, the above described optical device 3 may be used as the optical device 3 of the imaging apparatus 2. FIG. 13 is an explanatory diagram of the imaging apparatus 2 including the optical device 3 of this example. The imaging apparatus 2 includes the optical device 3 having the optical system 20 and an imager 15 placed on the reduction-side conjugate plane P of the optical system 20. In this case, a beam Q1 from the enlargement-side conjugate plane S enters the second transmission surface 33 located on the first face 35 of the optical element 23 at the upside Y1 of the first optical axis N. The beam entering the second transmission surface 33 is reflected by the reflection surface 32 located at the downside Y2 of the first optical axis N. A beam Q2 reflected by the reflection surface 32 is output from the first transmission surface 31 located at the downside of the first optical axis N and travels to the first optical system 21. The beam entering the first optical system 21 is imaged on the imager 15 placed on the reduction-side conjugate plane P. Even when the above described optical device 3 is used for the imaging apparatus 2, the same functions and effects as those of the case using the above described optical device 3 for the projector 1 may be obtained.

In the optical devices of the above described examples and modified examples, two lenses of the lens L1 and the lens L2 are movable along the first optical axis N, however, the configuration is not limited to that. For example, a single lens may be movable along the first optical axis N or three or more lenses may be movable along the first optical axis N. Further, a plurality of lenses may be movable in the same direction along the first optical axis N or in different directions.

What is claimed is:

1. An optical device comprising:
a first optical system having an optical reflecting lens;
a second optical system having a lens and disposed at a reduction side of the first optical system;
a first holding member holding the optical reflecting lens;
a first movement mechanism configured to move the first holding member in optical axis directions along an optical axis of the reflecting lens;
a second holding member holding the second optical system lens; and
a second movement mechanism configured to move the second holding member along the optical axis directions, wherein
the optical reflecting lens has a reflection surface,
the first movement mechanism has a fixing member supporting the first holding member rotatably around a rotation axis and a transport portion configured to move the first holding member along the optical axis directions according to rotation of the first holding member,
the reflection surface has a shape rotationally symmetrical with respect to the rotation axis, and
the rotation axis and the optical axis are the same axis.

2. The optical device according to claim 1, wherein
the fixing member has as overlap part overlapping with the second holding member when viewed from a direction orthogonal to the optical axis, and
the second movement mechanism has:
an annular cam supported by the overlap part rotatably around the optical axis;
a cam groove provided in the annular cam;
a cam follower pin provided in the second holding member and configured to slide the cam groove; and
a guide groove provided in the overlap part and configured to guide the cam follower pin in the optical axis directions.

3. The optical device according to claim 1, wherein
the transport portion is a helicoid provided between the fixing member and the first holding member.

4. The optical device according to claim 3, wherein
the helicoid is provided at an outside in a radial direction of the optical reflecting lens.

5. The optical device according to claim 1, wherein
the first holding member has a first holding portion holding the optical reflecting lens at an enlargement side with respect to the second optical system, and a cylindrical portion disposed at an outside in a radial direction of the second optical system,
the fixing member has an overlap part overlapping with the second holding member when viewed from a direction orthogonal to the optical axis,
the second movement mechanism has
a cam groove provided in the cylindrical portion;
a cam follower pin provided in the second holding member and configured to slide the cam groove; and a guide groove provided in the overlap part and configured to guide the cam follower pin in the optical axis directions, and the transport portion is a helicoid provided between the overlap part and the cylindrical portion.

6. The optical device according to claim 1, wherein
the first holding member has an operation portion disposed at an opposite side to the first optical system with respect to the optical reflecting lens and configured to rotate the first holding member, and
a rotation axis of the operation portion and the optical axis are the same axis.

7. The optical device according to claim 1, wherein
the first movement mechanism has:
  an operation member rotatable around a rotation axis parallel to the optical axis;
  a first teeth portion provided in the operation member; and
  a second teeth portion provided in the first holding member and meshing with the first teeth portion at a predetermined reduction ratio.

8. The optical device according to claim 1, wherein
the reflection surface is a concave curved surface.

9. The optical device according to claim 8, wherein
the optical reflecting lens has a first transmission, surface, the reflection surface placed at the reduction side of the first transmission surface, and a second transmission surface at the reduction side of the reflection surface.

10. The optical device according to claim 9, wherein
the optical reflecting lens has a first face facing a second optical system side, a second face facing an opposite side to the first face, and a reflection coating layer provided on the second face,
the second face has a convex shape,
the first transmission surface and the second transmission surface are provided on the first face,
the reflection surface is the reflection coating layer and a surface shape of the second face is transferred thereto,
the first holding member rotates within a predetermined angle range, and
the first transmission surface, the reflection surface, and the second transmission surface have rotationally symmetrical shapes with respect to the optical axis in the predetermined angle range.

11. The optical device according to claim 1, wherein
the reflection surface is a convex curved surface.

12. A projector comprising:
a liquid crystal panel modulating light emitted from a light source; and
the optical device according to claim 1, projecting the light modulated by the liquid crystal panel.

13. An imaging apparatus comprising:
the optical device according to claim 1; and
an imager disposed on a reduction-side conjugate plane on which light emitted from the optical device is imaged.

14. An optical device comprising:
a first optical system having an optical reflecting lens;
a second optical system having a lens and disposed at a reduction side of the first optical system;
a first holding member holding the optical reflecting lens; and
a first movement mechanism configured to move the first holding member in optical axis directions along an optical axis of the reflecting lens, wherein
the optical reflecting lens has a reflection surface,
the first movement mechanism has a fixing member supporting the first holding member rotatably around a rotation axis and a transport portion configured to move the first holding member along the optical axis directions according to rotation of the first holding member,
the reflection surface has a shape rotationally symmetrical with respect to the rotation axis,
the rotation axis and the optical axis are the same axis,
the first holding member has an operation portion disposed at an opposite side to the first optical system with respect to the optical reflecting lens and configured to rotate the first holding member, and
a rotation axis of the operation portion and the optical axis are the same axis.

15. An optical device comprising:
a first optical system having an optical reflecting lens;
a second optical system having a lens and disposed at a reduction side of the first optical system;
a first holding member holding the optical reflecting lens; and
a first movement mechanism configured to move the first holding member in optical axis directions along an optical axis of the reflecting lens, wherein
the optical reflecting lens has a reflection surface,
the first movement mechanism has a fixing member supporting the first holding member rotatably around a rotation axis and a transport portion configured to move the first holding member along the optical axis directions according to rotation of the first holding member,
the reflection surface has a shape rotationally symmetrical with respect to the rotation axis,
the rotation axis and the optical axis are the same axis, and
the first movement mechanism further has:
  an operation member rotatable around a rotation axis parallel to the optical axis,
  a first teeth portion provided in the operation member, and
  a second teeth portion provided in the first holding member and meshing with the first teeth portion at a predetermined reduction ratio.

16. An optical device comprising:
a first optical system having an optical reflecting lens;
a second optical system having a lens and disposed at a reduction side of the first optical system;
a first holding member holding the optical reflecting lens; and
a first movement mechanism configured to move the first holding member in optical axis directions along an optical axis of the reflecting lens, wherein
the optical reflecting lens has a reflection surface,
the first movement mechanism has a fixing member supporting the first holding member rotatably around a rotation axis and a transport portion configured to move the first holding member along the optical axis directions according to rotation of the first holding member,
the reflection surface has a shape rotationally symmetrical with respect to the rotation axis,
the rotation axis and the optical axis are the same axis,
the reflection surface is a concave curved surface,
the optical reflecting lens has:
  a first transmission, surface, the reflection surface placed at the reduction side of the first transmission surface, and a second transmission surface at the reduction side of the reflection surface, and has a first face facing a second optical system side, a second face facing an opposite side to the first face, and a reflection coating layer provided on the second face, the second face has a convex shape, the first transmission surface and the second transmission surface are provided on the first face, the reflection surface is the reflection coating layer and a surface shape of the second face is transferred thereto, the first holding member rotates within a predetermined angle range, and the first transmission surface, the reflection surface, and the second transmission surface have rotationally symmetrical shapes with respect to the optical axis in the predetermined angle range.

\* \* \* \* \*